April 28, 1959 D. H. PRITCHARD ET AL 2,884,480

COLOR TELEVISION SYNCHRONOUS DETECTORS

Filed May 26, 1954

United States Patent Office 2,884,480

Patented Apr. 28, 1959

2,884,480

COLOR TELEVISION SYNCHRONOUS DETECTORS

Dalton H. Pritchard, Princeton, N.J., and Alfred C. Schroeder, Huntingdon Valley, Pa., assignors to Radio Corporation of America, a corporation of Delaware Application May 26, 1954, Serial No. 432,531

11 Claims. (Cl. 178—5.4)

The present invention relates to a simplified means for synchronous detection and in particular refers to a novel circuit for synchronously demodulating color difference signals from a color subcarrier in a simplified manner and utilizing an approach which permits D.-C. coupling through the synchronous detector.

Color television is the reproduction on the viewing screen of a receiver of not only the relative luminance or brightness, but also the color hues and saturations in the original scene. Luminance, hue, and saturation form the three independent attributes of color vision. Luminance is that characteristic of colors that is transmitted by ordinary black-and-white or monochrome television systems. Hue is the characteristic by means of which colors may be placed in categories such as red, green, yellow, blue, and so on. Saturation represents the degree by which a color departs from a gray or a neutral of the same brightness and may also be thought of as related to the physical purity or the amount of white light which is mixed or added to a hue.

The electrical transfer of images in color may be accomplished by additive methods; color images may be transferred by not only analyzing the light from an object into image elements, as is accomplished by a normal scanning procedure, but also by analyzing the light from elemental areas of objects or images into selected primary or component colors and thereby deriving therefrom a signal representative of each of the selected component colors. A color image may be reproduced at a remote point by appropriate reconstruction from a component color signal train. The problem then becomes; what is the nature of the signals to be transmitted? According to standards for the transmission of color television signals which were approved by the Federal Communications Commission on December 17, 1953, the color television signal which is used for commercial color television transmission in the United States contains several types of signals. In addition to the normal scanning synchronization signals which are also used for standard monochrome transmission, the commercial television signal also includes a luminance signal, a chrominance modulated color subcarrier which contains information relating to hue and saturation and a color synchronizing burst, which as will be seen, synchronizes the color circuits of a color television receiver with a master oscillator at the transmitter.

Consider first the nature of the luminance signal; it is important that the luminance signal permit the color television system to be a compatible one, that is, that the signal produced by the color television signal provide service to black-and-white receivers. This is easily accomplished in a color television signal by adding signals from component red, green, and blue image pickup tubes in proportion to the relative luminosities of the brightness. If the three primaries are mixed together in the proportions given by the following equation $$Y=.30R+.59G+.11B \qquad (1)$$

a suitable monochrome signal will be transmitted which will contain information from black through all shades of gray to white. This signal should be generated in accordance with existing scanning standards and be treated exactly like a standard monochrome signal with respect to bandwidth and the addition of synchronizing and blanking pulses.

Consider also the fundamental nature of the chrominance modulated color subcarrier. It follows from Equation 1, that if luminance information is transmitted according to the relationship observed in Equation 1, then the red, green, and blue signals required for the image reproducer in the color television receiver may be provided by transmitting what are called color difference signals, namely $R-Y$, $G-Y$, and $B-Y$ signals. When considered in combination the luminance signal and the color-difference signals indicate how each color in the televised scene differs from a monochrome color of the same luminance. Actually if direct transmission of the color-difference signals were desired it would only be necessary to transmit say the $R-Y$ and the $B-Y$ signals; it is easily shown that the $G-Y$ signal may be formed by combining the $B-Y$ and the $R-Y$ signals according to the following relationship $$G-Y=.51(R-Y)-.19(B-Y) \qquad (2)$$

Actually the color-difference signals denoted as $R-Y$, $B-Y$, and $G-Y$ are not transmitted directly; rather it is convenient to make use of the known characteristics of the eye and transmit what are termed I and Q signals. The I signal is principally an orange-cyan signal and the Q signal is principally a green-purple signal. At the receiver the color-difference signals may be recovered by proper combination of the I and Q signals according to the following relationships $$R-Y=.96I+.62Q \qquad (3)$$
$$B-Y=-1.10I+1.70Q \qquad (4)$$
$$G-Y=-.28I-.64Q \qquad (5)$$

The I signal is a high definition signal; since the color subcarrier is transmitted at a frequency of 3.58 mc. and since the upper edge of the color picture band is in the vicinity of 4.2 mc. it follows that it is convenient to transmit the high definition I signal so that it is double sideband for I signal components up to ½ mc. and single sideband for components from ½ mc. to approximately 1½ mc., the single sideband components, of course, being positioned as lower sidebands to the color subcarrier. The Q signal, being a low definition signal, is transmitted as a double sideband signal with its upper frequency components limited to approximately ½ mc.

Having formed the I and Q signals, consider now the manner whereby the color modulated subcarrier is formed. It is required that the I and Q signals be transmitted on the color subcarrier in a fashion whereby crosstalk between the I and Q signals is eliminated or minimized. It is also required that the I and Q modulated color subcarrier have the property whereby its phase yields an indication of hue while its amplitude yields an indication of saturation. It is not desirable to use two separate frequency interlaced carriers, one for the I signal and one for the Q signal, because the difference frequency between them would be an even multiple of one-half the frame frequency and hence would have no tendency to be self-cancelling; the difference frequency would be passed as a beat between the two carriers, whenever the signal is passed through any non-linear device such as a kinescope. However, the need for two carrier frequencies can be eliminated by the use of the two-phase modulation technique which is equivalent to the use of two carriers of the same frequency but with a phase separation of 90°.

As has been described, the frequency of the color subcarrier is approximately 3.58 mc. In the arrangement which is used for modulating the color subcarrier, two independent signals, the I and Q signals, are modulated upon two carriers each having the frequency of 3.58 mc. but 90° apart in phase. By using a balanced modulator and by having the output of the two modulators feed a common transmission channel the modulated waves are simply added together to yield a simultaneously modulated I and Q suppressed carrier color modulated subcarrier. In order that the phase of the signals in the I and Q modulated suppressed carrier modulated subcarrier may be accurately determined at the receiver, a synchronizing burst of approximately 8 mc. of the color subcarrier is included on the back porch of the horizontal synchronizing pulse prior to every scanned line. The phase of this synchronizing burst is such that it leads the I signal by 57° which in turn leads the Q signal by 90°.

At the receiving end, the color signals, whether I and Q signals or $R-Y$, $G-Y$ and $B-Y$ signals may be recovered by utilizing the processes of synchronous detection. Synchronous detection is a very vital technique in the techniques of color television. It permits the recovery of the color signals at described hues from the I and Q modulated suppressed carrier color modulator subcarrier by the simple process of beating the modulated color subcarrier by a locally generated carrier signal whose phase corresponds to the desired color difference signal; the signal phase is accurately synchronized by the color synchronizing burst by use of suitable electronic circuitry.

The need for carrier reinsertion in a color television receiver need not be regarded as a serious disadvantage when account is taken of the fact that an important advange—suppressed carrier transmission—may be utilized without further complexity. In ordinary AM broadcasting, fully half of the radiated energy is in the carrier component which transmits no information by itself but which simply provides the frequency reference against which the sidebands may be heterodyned in simple diode detectors to recover the intelligence in the sidebands. If a locally generated carrier is available in the receiver, then there is no need to transmit a carrier along with the sidebands. In a color television system of the type utilizing the previously described modulated color subcarrier, the suppression of the subcarrier not only saves signal energy but also reduces the possibility of spurious effects in images, since the complete subcarrier component goes to zero and hence cannot cause interference whenever the camera scans a white or neutral surface.

Despite the fact the I and Q signals are utilized to modulate the color subcarrier in the color television signal, it is an interesting and highly useful characteristic of the modulated color subcarrier that it also contains most of the other colors which are necessary for the reconstruction of a transmitted color image, these colors all being related whereby their hue corresponds to a particular phase of the color subcarrier, and, as has been mentioned their saturation corresponds to the amplitude of the color subcarrier in the phase to which the hue is related. It follows then that in any color television receiver one of the major operations which must be accomplished is the recovery of the color-difference or the component color signals from the color subcarrier so that they may be recombined in some suitable fashion to produce the color difference signals which are then combined with the Y signal to produce component color signals which are useful for driving the control elements of a color image reproducer. The present invention offers the highly simplified and direct approach to synchronous detection for use in color television receivers. It has the added advantage in that not only are the A.-C. components of the color signals recovered, but also the so-called D.-C. component so that provided suitable succeeding amplifier stages and matrix stages are used, no D.-C. restoration circuits are necessary. In fact, if the succeeding amplifier and matrix stages are of high enough gain level the signals may be almost immediately applied to the control elements of the color image reproducer. The synchronous detector which follows from the teachings of the present invention also has the added advantage in its simplicity of circuit, since it uses rectifiers rather than electron control tubes and, since, as will be shown, the phase of the synchronous detection process is very easily adjusted.

It is therefore an object of this invention to provide a simplified means of synchronous detection in a color television receiver.

It is yet another object of this invention to provide a rectifier type of synchronous detector which can be used for synchronous demodulation of a phase and amplitude modulated subcarrier.

It is yet another object of this invention to provide a type of amplitude-sampling synchronous detector circuit which not only can be utilized for recovering A.-C. components of a color television signal but also the D.-C. components.

It is yet another object of this invention to provide a synchronous detector to which is applied a pair of locally generated signals 180° out of phase with respect to one another; the precise phase at which the synchronous detector is to be caused to function may be simply adjusted by the tuning adjustment of a resonant circuit.

It is still another purpose of this invention to provide a synchronous demodulator which is more economical to construct than conventional electron tube synchronous detector circuits.

In one form of the invention, an unbalanced rectifier circuit is utilized to sample the amplitude of the color subcarrier at a frequency and phase prescribed by an applied demodulating signal. The action of the unbalanced circuit is adjusted whereby an integrating circuit is caused to produce a voltage which is proportional to the signal or envelope corresponding to that particular phase of the modulated color subcarrier.

In still another form of the invention a twin-rectifier unbalanced bridge circuit is caused to be simultaneously driven by a color television signal and by an alternating current signal from a synchronized source, the alternating current signal causing the unbalanced twin rectifier circuit to sample the envelope of the color subcarrier at prescribed phases. A filter circuit is then utilized to convert the derived sampling signal into a continuous signal which yields not only the components which represent the alternating current components of the color signal being demodulated but which also contains a D.-C. component so that by use of proper succeeding circuits, no D.-C. restoration is necessary.

In still another form of the invention, the video signal is passed to an unbalanced circuit; the oscillator signal is impressed on a balanced circuit; unidirectional impedances are utilized for signal multiplication and hence synchronous detection.

Any incidental object of this invention will become apparent upon a reading of the following specifications and an inspection of the figures in which.

Figures 1, 2:
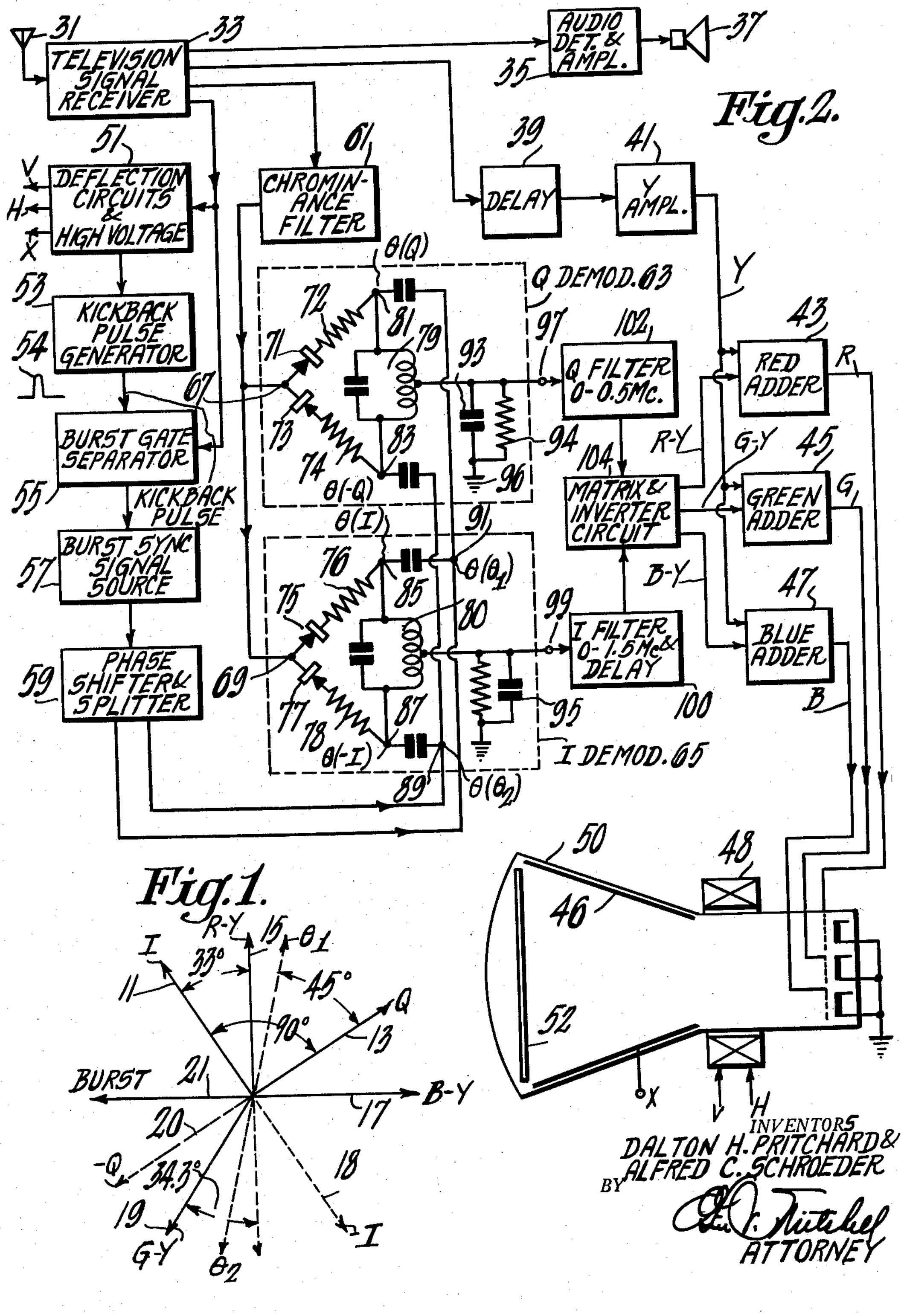
Figure 1 shows a vector diagram relating hue and phase in color subcarrier.
Figure 2 shows the block diagram of a colored television receiver; included in this diagram is the schematic diagram of the Q demodulator and the I demodulator which involved the present invention.

Before turning to the present invention, consider the vector diagram shown in Figure 1. This vector diagram resembles very closely the color diagrams and primary color charts which are often used by school children. As related to the color subcarrier, the vector diagram gives an indication of the hue as a function of phase angle while the amplitudes of the vectors give an indication of the color saturation. When dealing with white or with grays, the information forms the hub of the diagram since white or gray does not contain hue or saturation information.

The synchronizing burst is represented by the vector 21. It is seen from Figure 1 that the $R-Y$ vector 15 lags the burst vector 21 by 90°, with the $B-Y$ vector 17 lagging the $R-Y$ vector 15 by 90°. The I and Q vectors are in quadrature with the I vector 11 leading the $R-Y$ vector 15 by 33°. Also indicated in Figure 1 are several of the other hues which are possible; namely, minus I 18 which is cyan and the $G-Y$ vector 19.

The present invention is devoted to teaching an improved means for synchronously demodulating hue and saturation information from a color subcarrier. There are many, many varieties of hue information available, as distinguished by a particular phase angle. The present invention is actually applicable to any and all types of systems which are to be employed for extracting phase information from a color subcarrier, whether it be devoted to utilizing the I and Q signals, whether it be devoted to extracting the color difference signals directly, or whether it be devoted to extracting some suitable pair or group of signals which are to be later improved for color reproduction.

Consider at this point the operation of a color television receiver which utilizes the present invention for I and Q signal demodulation. The discussion will initially be devoted to the broader concepts of the usage of the I and Q demodulators; following this discussion the I and Q demodulators will be discussed in detail to clearly illustrate the teachings and applications of the present invention.

In the color television receiver in Figure 2 the incoming signal arrives at the antenna 31 from which it is impressed on the television signal receiver 33. The operation of the television signal receiver 33 is fairly conventional in that it combines the functions of first detection, intermediate frequency amplification, and second detection, in addition to such important secondary functions as automatic gain control and adjacent channel and co-channel signal trapping. For a discussion of the general operation of a television signal receiver, see, for example, the discussion by Antony Wright in his article entitled "Television Receivers" as published in the RCA Review for March 1947.

Once the incoming television signal has been recovered the sound must be recovered; this can be accomplished by utilizing, for example, the well known principle of inter-carrier sound. Once the modulated sound carrier which is a part of the color television signal has been recovered, it may be applied to the audio detector and amplifier 35 which impresses the sound signal on the loud speaker 37.

Consider now the various branches through which the recovered television information must pass before a color television image can be reproduced by the color kinescope 50.

The signal from the television signal receiver 33 is applied to the deflection circuits and high voltage source 51 which delivers vertical and horizontal deflection signals to the vertical and horizontal deflection yokes 48; the high voltage supply delivers a high voltage to the ultor 46 of the color kinescope 50.

Before the color television signal can be subjected to synchronous detection, it is necessary that a locally generated color signal be produced which can be accurately synchronized with the color synchronizing burst in the color television signal. There are many types of burst synchronized local-signal generating circuits which may be used; for example, reactance-tube automatic frequency control circuits, ringing circuits, or injection-lock circuits may be used. Any and all of these types of circuits may be synchronized by the color synchronizing burst by employing appropriate circuitry. It is, therefore, necessary to produce some means of separating the color synchronizing burst from the color television signal. In the circuit shown in Figure 2, the deflection circuits and high voltage 51 drive a kickback pulse generator 53 which produces a kickback pulse 54 which has a duration time substantially that of the color synchronizing burst. The kickback pulse 54 is then utilized to operate the burst gate separator 55 upon which is impressed the color television signal. The burst gate separator 55 is a gate circuit which is opened during the duration of the kickback pulse 54 so that the color synchronizing burst is then separated from the color television signal and applied to the burst synchronized signal source 57. The output of the burst output signal source 57 is used to drive the phase shifter and splitter 59 which delivers a pair of signals, having the frequency of the color synchronizing burst but having the phases $\theta_1$ and $\theta_2$, to the Q demodulator 63 and I demodulator 65. The precise use of the two signals having the phases $\theta_1$ and $\theta_2$ will be discussed in the more detailed discussion of the Q demodulator 63 and the I demodulator 65 which will follow later in these specifications.

The color television signal is applied to the chrominance filter 61 which passes only those frequencies in the range from approximately 2.2 megacycles to 4.2 megacycles; the output of the chrominance filter 61 is then impressed at the inputs of the Q demodulator 63 and the I demodulator 65. Interaction of the signals from the chrominance filter 61 and the phase shifter and splitter 59 in the Q demodulator 63 and the I demodulator 65 produce a Q signal at the output terminal 97 and an I signal at the output terminal 99; these output signals contain the D.-C. information relaying to the I and Q signals in addition to the A.-C. information.

The Q signal is then passed through the Q filter 102 which has a pass band from 0 to approximately 0.5 megacycle. The I signal is passed through the I filter and delay 100 which has a pass band from approximately 0 to 1.5 megacycles and includes provisions for delaying the signals so that it will match the delay characteristics of the Q filter 102 which has a different delay time due to its narrower pass band. The I and Q signals are then passed into the matrix and inverter circuit 104 at whose output the $R-Y$, $G-Y$, and $B-Y$ signals are produced.

Issuing from the television receiver 33 is the color television signal which contains luminance information. This luminance information is passed through the delay line 39 which causes the luminance or Y information to have the same delay as the I and Q signals. The Y signal is then passed through the Y amplifier 41 and applied simultaneously to the red adder 43, the green adder 45, and the blue adder 47.

In the red adder 43, the Y signal is added to the $R-Y$ signal to yield the red signal; in like fashion the green adder 45, and the blue adder 47 which are responsive to the Y and $G-Y$ signals and the Y and $B-Y$ signals respectively, yield a green signal and a blue signal respectively. The red, green and blue signals are then applied to appropriate grids of the color kinescope 50 so that in conjunction with suitable deflecting signals, and potentials, a color image representing the color television signal is produced on the image face of the color kinescope 50.

Consider now then operation of the Q demodulator 63 and the I demodulator 65. There are many methods for synchronous detection in a color television receiver; they involve for example the use of signal multiplying circuits, heterodyning circuits, or envelope sampling. For a discussion of one or more of these types of synchronous demodulators, see for example the discussion by Pritchard and Rhodes in their paper entitled, "Color Television Signal Receiver Demodulator" in the RCA Review for June 1953. This paper discusses not only multi-grid tube circuits but also diode or rectifier circuits which may be employed. The present invention will be seen to employ rectifiers or diodes; the use of various types of circuits employing rectifiers for synchronous demodulation have been described in detail in, for example, the copending United States patent application entitled, "Visual Indicating Systems" by George C. Szyklai and also in the copending United States patent application entitled "Color Television" by the present inventors.

The use of rectifiers or diodes in systems designed for synchronous demodulation involves, in one concept, principles associated with what is known as envelope sampling of a modulator subcarrier wave. It has been mentioned that the color subcarrier contains hue information which is precisely related to certain phase angles. It follows then that by appropriate sampling of the envelope of the color subcarrier at the prescribed phases, an indication of the amplitude corresponding to these phases can thereby be obtained; the precise amplitude involved in the sampling will give a measure of the saturation. What is desired of any rectifier or pulse sampler system is that the envelope of the color subcarrier be automatically sampled at a proper point in time and that this sampled information then be converted into I or Q information which can then be utilized for complete recovery of component color information. The present invention following the envelope sampling concept accomplishes this in a unique and simple fashion; the sampling is sharp and accurate and, what is even of greater importance is the fact that the D.-C. information associated with the wave being demodulated is retained during the process of demodulation.

Consider now the operation of the Q demodulator 63 in Figure 2. The Q demodulator consists of a triangular, unbalanced bridge-type circuit. It involves the use of three paths which form the triangle. One path between the input terminal and the terminal 81 contains the rectifier 71 and the resistor 72. The second path between the input terminal 67 and the terminal 83 contains the rectifier 73 and the resistor 74. Note that the rectifier 73 is reversed in its path with respect to the connection of the rectifier 71 thereby unbalancing the path to yield an operation and characteristic performance which enhances the operation of the present invention. In the bridge path between the terminals 81 and 83 is located the tuned circuit 79 which has a resonant frequency substantially that of the color synchronizing burst.

The phase shifter and splitter 59 is caused to provide a signal having phase $\theta_1$ to the terminal 91 and a phase $\theta_2$ to the terminal 89. It is seen from Figure 1 that $\theta_1$ is located in phase half way between the phases of the I and Q signals while $\theta_2$ is 180° out of phase with respect to $\theta_1$. These signals appearing at terminals 89 and 91 are then applied through by-pass condensers to the terminals 83 and 81 respectively of the tuned circuit 79. By detuning the tuned circuit 79, the signal appearing across the tuned circuit 79 and, therefore, across the terminals 81 and 83, will be shifted in phase so that the signal appearing at terminal 81 will have the phase of the Q signal 13 shown in Figure 1 while the phase of the signal appearing at terminal 83 will have the phase of the —Q vector 20 shown in Figure 1.

In like manner to the procedure described in the preceding paragraph, the tuned circuit 80 of the I demodulator 65 may be detuned in a direction opposite to the detuning employed for tuned circuit 79 to produce a phase shift whereby the signal appearing at terminal 85 will have a phase of the I vector 11 shown in Figure 1 while the phase of the signal appearing at terminal 87 will have the phase of the —I vector 18 shown in Figure 1. By specifying that the phase $\theta_1$ be half way between the phases corresponding to the I and Q vector shown in Figure 1 then the system comprising both the Q demodulator 63 and the I demodulator 65 present a balanced load to the phase shifter and splitter 59. This, of course, is purely an engineering consideration to yield optimum utilization and adjustment of the component circuitry; it follows, however, that the angle $\theta_1$ and its corresponding inversion angle $\theta_2$ may be adjusted to any of several phases if balance is not desired.

Consider now one type operation of the Q demodulator 63 relative to the action of the rectifiers 71 and 73; later in these specifications, other types and concepts of operation will be described. Due to the presence of the signal developed by the tuned circuit 79, as has been mentioned, a signal having a Q phase will be developed across the terminal 81 while a signal having a negative Q phase will be developed across the terminal 83. These two signals are 180° out of phase with respect to each other, or substantially so. This has an important effect on the Q demodulator circuit 63. It means that the rectifier 71 will cause to be conducting during a portion of one-half of the cycle of the Q phased signal and that the other rectifier 73 will be caused to be conducting during substantially the same time. The fact that the rectifier 73 is caused to conduct during the same half cycle of operation as the rectifier 71 rather than the next half cycle as would be the case in a balanced rectifier system causes the circuit branches between the input terminal 67 and the terminal 81 and between the input terminal 67 and the terminal 83 to be substantially connected to the output terminal 97 during this half cycle of operation; however, current will flow through the condenser 93 only during the time interval when the rectifiers 71 and 73 conduct. This will cause an unbalance in charge across the condenser 93, thereby producing a voltage from the output terminal 97 to the ground terminal 96; as the charge builds up, the rectifiers 71 and 73 will then be caused to conduct only for a brief interval of the half cycle during which the conduction takes place. This brief interval represents that interval of the signal provided by the phase shifter and splitter 59 during which a signal provided by the chrominance filter 61 to the input terminal 67 will be permitted to pass through. This is tantamount to opening the circuit or sampling the envelope of the color subcarrier from the chrominance filter 61 during the brief of time which corresponds to the positive peak of a sinusoidal wave having the Q phase. During this brief interval then, the color modulated subcarrier amplitude is sampled and a signal is developed across the condenser 93 and the shunt resistor 94 which will follow the successive sampled envelope voltages and, therefore, provide at the terminal 97, an excellent indication of the Q information provided by the color subcarrier.

In like manner to the operation described in the preceding paragraph, the I demodulator 65 will present a demodulated I signal at the output terminal 99. The I and Q signals may then be passed through their respective filters to the matrix and inverter circuits 104 where the $R-Y$, $G-Y$, and the $B-Y$ color difference signals are formed to be used in conjunction with the Y signal in the manner previously described in connection with the circuit in Figure 2.

The preceding discussion has discussed the concepts relating to subcarrier envelope sampling. There are at least two other concepts which may be utilized for describing the operation of the present invention. The present invention may be described in terms of the multiplication properties or heterodyning properties of a non-linear impedance or it may be described in terms of its operation as a rectification mechanism.

Consider now the concepts relating to the properties of rectifiers which permit the multiplication of one or more waves to produce components which are related to these waves. It is well known from the general theory of non-linear impedances that if two or more waves are impressed on a non-linear impedance, multiplication of the two waves will take place. An extensive discussion of the theory of waves impressed on non-linear impedances from the standpoint of the power series representations of such impedances is presented, for example, in chapter 8 of the book "Communication Engineering," by W. L. Everett, as published by the McGraw-Hill Book Company in 1937.

It is shown there that if waves of substantially the same frequency are beat together then sum and difference frequency components will be produced. The sum components, of course, will take place at approximately twice the frequency of either wave, the difference frequency will indicate any slight changes in frequency, or if the frequencies are the same, any changes in phase which may exist. This provides an important application for the use of such non-linear impedances as demodulators of color television signals in a color modulated subcarrier air, for, as has been mentioned, the incoming color subcarrier which is modulated by both the I and the Q signals is beat or heterodyned with a locally generated signal having the same frequency as the carrier of the color modulated subcarrier (the carrier of the color subcarrier actually being suppressed). Since the color information is contained in signals having predetermined phase relationships and since by use of the well known principles of synchronous detection, the color information at various phases can be recovered by heterodyning the color subcarrier with the locally generated signal at the prescribed phase, the color information can be recovered by utilizing a non-linear impedance such as a rectifier or a diode. This operation is straight-forward and simple in addition to affording considerable simplification in circuitry in color television receivers.

It is already well known that a rectifier, for example, is a non-linear impedance yielding conduction in only one direction. It is not enough, however, to merely impress the color subcarrier on the non-linear impedance such as a rectifier with some arbitrary signal. If synchronous detection is to be accomplished, it is important that the rectifier be caused to produce the multiplication of the color subcarrier with the locally generated signal of prescribed phase. The simultaneous impressing of both the color subcarrier and the locally generated signal of prescribed phase on the rectifier has the effect of utilizing the locally generated signal of prescribed phase to perform the process of conduction at prescribed times which are dependent upon the phase of the locally generated signal. The net result of this selective conduction of the rectifier due the locally generated signal is the beating of the locally generated signal and the color subcarrier in a manner whereby the color signal is synchronously demodulated.

In a system such as that shown in Figure 2 for the Q demodulator 63, the development of oscillations across the resonant circuit 79 at a phase corresponding to that required for the synchronous demodulation of the Q signal and the filtered chrominance information applied to the terminal 67, causes the Q phased locally generated signal and the chrominance signal to be simultaneously impressed on both the rectifiers 71 and 73. Since the rectifiers are connected in an unbalanced fashion in the circuit and since the signal in the terminal 83 is essentially a —Q signal having a phase 180° out of phase with regard to the Q demodulating signal applied to the terminal 81, then the non-linear action of rectifiers 71 and 73 cause the simultaneous development of the frequency difference components. These frequency difference components actually constitute the demodulated color information which is then caused to appear at the output terminal 97. The use of the unbalanced circuit shown for the Q demodulator 63 in addition to the use of the resonant circuit 79 connected in the manner illustrated permits complete D.-C. coupling from the input terminal 67 to the output terminal 97 so that the D.-C. information relating to the chrominance or demodulated color signal will appear at the output terminal 97 in addition to the harmonic color components. Note that the very high frequency components developed by the beating of the two signals at frequencies substantially twice the frequency of the color subcarrier may be easily filtered out; in the case of the circuit shown in Figure 2 this filtering is accomplished by the Q filter 102.

When the Q demodulator 63 is viewed with regard to the concepts discussed in the preceding paragraphs, it is evident, therefore, that the use of this circuit provides a simple means for the recovery of the required color information which is produced across the output terminal 97.

Earlier in these specifications, mention has been made of the use of the capacitor 93 to develop biasing voltages so that the Q demodulator 63 could function as an envelope sampling device. This is only one of the methods of operation which is possible with the present invention. It follows from the discussion relating to the property of the rectifiers whereby they are caused to act as non-linear impedances, that the circuit need not function as an envelope sampling device; in fact, the non-linear properties of the rectifiers 71 and 73 will yield the desired information so that if the capacitor 93 which, in one form of the invention, performs an integrating action, were to be eliminated, the circuit could still function in a highly satisfactory manner.

With regard to yet another concept regarding envelope sampling, it follows that because of the non-linear properties of the rectifiers 71 and 73 the circuit will function satisfactorily with the rectifiers 71 and 73 conducting for a fairly substantial portion of each half cycle represented by the locally generated signals presented at the terminals 81 and 83. This, of course, prevents the application of concepts relating to sharp pulse envelope sampling; however, by employing the rectifiers 71 and 73 in view of their non-linear characteristics the ability of circuit to perform ably and efficiently is understood.

Another aspect of the circuit which is keeping with the spirit and teachings of the present invention is the fact that in the triangular bridge type circuit shown for the Q demodulator 63, the circuit is unbalanced as far as the video information is concerned; it is balanced, however, for the signal provided by the burst synchronized local oscillator system. This has the advantage of simplifying the design of the local signal source system. The circuit also presents the additional and very highly important advantage that it is not necessary for the burst synchronized signal source 57 in conjunction with the phase shifter and splitter 59 to produce signals of the phases required for direct color signal synchronous demodulation since the resonant circuit 79 can be adjusted by detuning to bring a signal of proper phase between the terminals 81 and 83 in a manner which is susceptible to simplified adjustment and which is relatively indifferent to the precise signal output phase of the phase shifter and splitter 59.

Having described the invention, what is claimed is:

1. A color television synchronous demodulator circuit, said color television synchronous demodulator circuit adapted to demodulate a color difference signal in a color subcarrier, said color difference signal distinguished by a predetermined phase, said color television synchronous demodulator circuit including, a triangular bridge network, said triangular bridge network including an input terminal, a first circuit arm, said first circuit arm including a rectifier, a second circuit arm, said second circuit arm including a rectifier, a resonant circuit, said resonant circuit tuned to substantially the frequency of said subcarrier, said resonant circuit connected between a first terminal and a second terminal, said first circuit arm coupled between said input terminal and said first terminal, said second circuit arm coupled between said input terminal and said second terminal, the direction of the rectifiers in said first circuit arm and said second circuit arm adjusted whereby said rectifiers are essentially unbalanced relative to said input terminal, a signal generator, said signal generator adjusted to excite said resonant circuit to yield oscillations having frequency and phase characteristic of said predetermined phase of said chrominance signal, an output terminal, an integrating circuit, a fixed potential terminal, means for coupling said integrating circuit between said output terminal and said fixed potential terminal, and means for coupling said output terminal to said resonant circuit, whereby said color difference signal is caused to appear at said output terminal.

2. A triangular bridge demodulator circuit, said triangular bridge circuit including an input terminal, a second terminal and a third terminal, means for coupling a rectifier between said input terminal and said second terminal, means for coupling a second rectifier between said input terminal and said third terminal, said first rectifier and said second rectifier so connected in said triangular bridge circuit that they are substantially in the condition of being oppositely polarized with respect to said input terminal, a resonant circuit, said resonant circuit having a mid-terminal, means for coupling said resonant circuit between said second terminal, and said third terminal, an output terminal, means for coupling said mid-terminal to said output terminal, and means for exciting said resonant circuit at a predetermined frequency and phase.

3. In a color television receiver, said color television receiver adapted to receive at least a modulated subcarrier containing a chrominance signal and a color synchronizing burst, said chrominance signal distinguished by a prescribed synchronous detection phase, a synchronous demodulator circuit, said synchronous demodulator circuit comprising in combination, an input terminal, a first unidirectional impedance, a second unidirectional impedance, a second terminal, a third terminal, means for coupling said first unidirectional impedance between said input terminal and said second terminal, whereby said first unidirectional impedance has a predetermined direction, means for coupling said second unidirectional impedance between said input terminal and said third terminal, said second unidirectional impedance having a direction opposite to that of said first unidirectional impedance as referred to said input terminal, a tuned network, said tuned network including a mid-network connection, said tuned network having a resonant frequency substantially that of said color subcarrier, means for coupling said resonant network between said second terminal and said third terminal, a local signal source, said local signal source responsive to said color synchronizing burst and adapted to supply at least a first and a second signal, the phase of said first signal having a precribed phase relative to the phase of said color synchronizing burst, said second signal having a phase substantially 180° out of phase with regards to said first signal, means for coupling said first signal to said second terminal, means for coupling said second signal to said third terminal, means for coupling said modulated color subcarrier to said input terminal, means for detuning said resonant network whereby a signal is caused to appear at said second terminal having said prescribed synchronous detector phase and a signal is caused to be produced at said third terminal which is substantially 180° out of phase with respect to said signal appearing at said second terminal, an output terminal, said output terminal coupled to said mid-connection of said resonant network.

4. The invention as set forth in claim 3 and wherein said unidirectional impedances are rectifiers.

5. The invention as set forth in claim 3 and wherein an integrating circuit is provided between said output terminal and a fourth terminal, said fourth terminal having a predetermined potential.

6. In a color television receiver, said color television receiver adapted to receive a color modulated subcarrier containing a multiplicity of color signals, each of said color signals distinguished by a predetermined phase, in combination, a pair of color signal demodulators each responsive to said color modulated subcarrier, each of said color signal demodulators of the type employing unidirectional devices and adjusted to be unbalanced with regard to the color modulated subcarrier, each of said color signal demodulators including an oscillation network means, said oscillation network means coupled to said unidirectional devices whereby each of said unidirectional devices is caused to conduct simultaneously at prescribed portions of a cycle of any oscillations produced across said oscillation network means, a locally generated signal source, said locally generated signal source having a predetermined phase, a phase splitter device, said phase splitter device coupled to said local signal source and adjusted to yield a pair of output signals whereby the first of said output signals has a second predetermined phase and the second signal which has a phase substantially 180° out of phase with regard to said first signal, means for coupling said first signal and said second signal to said oscillation network means in both said first color demodulator and said second color demodulator, means for detuning said oscillation circuit means in said first color demodulator in one direction to provide oscillations of a third predetermined phase, and means for detuning the oscillation circuit means in said second color demodulator to provide oscillations having a fourth predetermined phase.

7. In a color television receiver a synchronous detector circuit comprising in combination: a first circuit to provide a chrominance signal wherein a first color difference signal to be demodulated occurs during a first time interval of said chrominance signal, a second circuit to provide an alternating current wave having a prescribed phase of said chrominance signal, a first and second rectifier circuit, means coupling said first and second rectifier circuit to said first circuit whereby said first and second rectifier circuits are differently polarized relative to said first circuit, a resonant circuit resonant at a frequency related to a frequency of said chrominance signal and coupled to said second circuit and responsive to said alternating current wave to develop first and second polarities of an alternating current wave having a first phase related to said first time interval of said chrominance signal, means coupling the extremities of said resonant circuit to said first and second rectifier circuits to apply said first polarity of said alternating current wave to said first rectifier circuit and said second polarity of said alternating current wave to said second rectifier circuit to thereby cause both said first and second rectifier circuits to simultaneously translate any information occurring during first time interval of said chrominance signal, and output circuit means coupled to an intermediate point of said resonant circuit and responsive to information translated by said first and second rectifier circuits for developing color difference signal corresponding to signal information occurring at said first time interval in said chrominance signal.

8. In a color television receiver adapted to receive a color television signal including a chrominance signal comprising a modulated carrier wherein different color difference signals occur at different phases of said chrominance signal, said color television signal including color synchronizing bursts having a reference phase related to the phases of said chrominance signal, a synchronous detector circuit comprising in combination: a first circuit responsive to said color television signal to provide said chrominance signal, a second circuit for deriving from said bursts an alternating current wave having a first phase of said modulating carrier, a first and second transmission path, each including a rectifier means and coupled to said first circuit, said rectifier means in said first and second transmission paths being oppositely polarized relative to said first circuit, a resonant circuit means resonant at a frequency in the vicinity of the frequency of said bursts and coupled to said second circuit and to said first and second transmission paths to apply a first polarity of said alternating current wave to the rectifier means in said first transmission path and a second polarity of said alternating current wave to the rectifier means in said second transmission path to develop demodulated color difference signal information corresponding to information occurring at said first phase of said chrominance signal in the rectifier means in said first and second transmission paths, and means coupled to the midpoint of said resonant circuit means and responsive to said demodulated color difference signal information derived in said first and second transmission paths to produce an output signal representing said demodulated color difference signal occurring at said first phase of said chrominance signal.

9. In a color television receiver adapted to receive a color television signal including a chrominance signal wherein different color difference signals occur during different phases of said chrominance signal, each of said color difference signals capable of being demodulated by signal mixing of said chrominance signal with an alternating current wave having the phase of said chrominance signal at which the color information signal to be demodulated occurs, said color television signal including color synchronizing bursts having a reference phase related to the phases of said chrominance signal and having a burst frequency, the combination of: a first circuit responsive to said color television signal to derive therefrom a chrominance signal; a second circuit to derive from said bursts first and second polarities of an alternating current wave having burst frequency and having a first phase of said chrominance signal; a first and second transmission path each including signal mixing means and coupled to said first circuit, a resonant circuit means nominally resonant at burst frequency and coupled between the signal mixing means in said first and second transmission paths, means to apply one polarity of said alternating current wave from said second circuit to the signal mixing means in said first transmission path and to apply the second polarity of said alternating current wave from said second circuit to the signal mixing means in said second transmission path thereby producing signal mixing of said chrominance signal with different polarities of said alternating current wave having said first phase of said chrominance signal in said first and second transmission paths, and means coupled to the midpoint of said resonant circuit means and responsive to the signal mixing produced in said first and second transmission paths to derive therefrom a color information signal corresponding to information occurring at said first phase of said chrominance signal.

10. In a color television receiver adapted to receive a color television signal including a chrominance signal wherein different color difference signals occur during different phases of said chrominance signal, each of said color difference signals capable of being demodulated by signal mixing of said chrominance signal with an alternating current wave having phase of said chrominance signal at which that color difference signal occurs, said color television signal including color synchronizing bursts having a reference phase related to the phases of said chrominance signal and having a first frequency, the combination of: a first circuit responsive to said color television signal to derive therefrom a chrominance signal; a second circuit to derive from said bursts first and second polarities of an alternating current wave having burst frequency and having a first phase of said chrominance signal; a third circuit comprising a first and second transmission path each including signal mixing means and coupled to said first circuit and a resonant circuit means nominally resonant at burst frequency and coupled between the signal mixing means in said first and second transmission paths, means to apply said first and second polarities of said alternating current wave to different spaced points on said resonant circuit and to tune said resonant circuit to a frequency related to said burst frequency to develop a first polarity of a second phase of said alternating current wave in said signal mixing means in said first transmission path and to develop a second polarity of said second phase of said alternating current wave in said signal mixing means in said second transmission path thereby producing signal mixing of said chrominance signal with different polarities of said alternating current wave having said second phase of said chrominance signal in said first and second transmission paths, and means coupled to an intermediate point on said resonant circuit and responsive to the signal mixing produced in said first and second transmission paths to derive therefrom a color difference signal corresponding to information occurring at said second phase of said chrominance signal.

11. In a color television receiver adapted to receive a color television signal including a chrominance signal wherein different color information signals occur during different time intervals of said chrominance signal, each of said color difference signals capable of being demodulated by sampling said chrominance signal during the time interval of said chrominance signal at which the color difference signal to be demodulated occurs, said color television signal including color synchronizing burst having a reference phase related to the phases of said chrominance signal and having a burst frequency, the combination of, a first circuit responsive to said color television signal to derive therefrom a chrominance signal, a second circuit to derive from said bursts first and second polarities of an alternating current wave having burst frequency and having a first phase of said chrominance signal, a first and second transmission path each including signal sampling means coupled to said first circuit, a resonant circuit means nominally resonant at burst frequency and coupled between the signal sampling means in said first and second transmission paths, means to apply one polarity of said alternating current wave from said second circuit to the signal sampling means in said first transmission circuit and to apply the second polarity of said alternating current wave from said second circuit to the signal sampling means in said second transmission circuit to produce signal information occurring in said chrominance signal at a first time interval in said first and second transmission paths, and means coupled to the midpoint of said resonant circuit means and responsive to the signal information produced in said first and second transmission paths to derive therefrom a color difference signal corresponding to information occurring at said first time interval of said chrominance signal.

References Cited in the file of this patent

UNITED STATES PATENTS

| | | |
|---|---|---|
| 2,644,030 | Moore | June 30, 1953 |
| 2,664,462 | Bedford | Dec. 29, 1953 |
| 2,743,310 | Schroeder | Apr. 24, 1956 |
| 2,745,900 | Parker | May 15, 1956 |
| 2,754,356 | Espenlaub | July 10, 1956 |

FOREIGN PATENTS

Two-Color Direct View Receiver RCA, November 1949.

Introduction to Color Television, Rider published, pages 141 and 142, March 1954.

Design Techniques for Color Television Receivers, Electronics, February 1954.